Feb. 13, 1968  A. J. GIGER ET AL  3,369,197
WAVEGUIDE MODE COUPLER
Filed Jan. 5, 1965  3 Sheets-Sheet 1
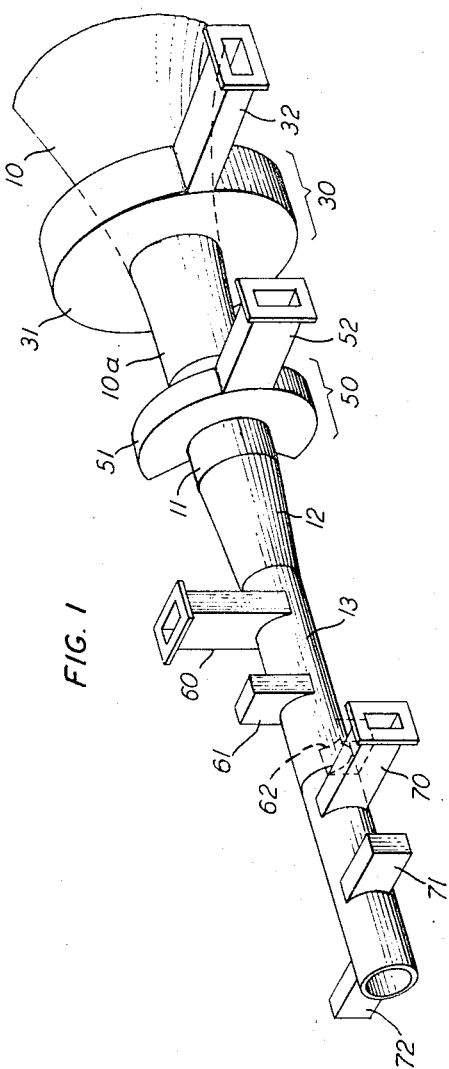
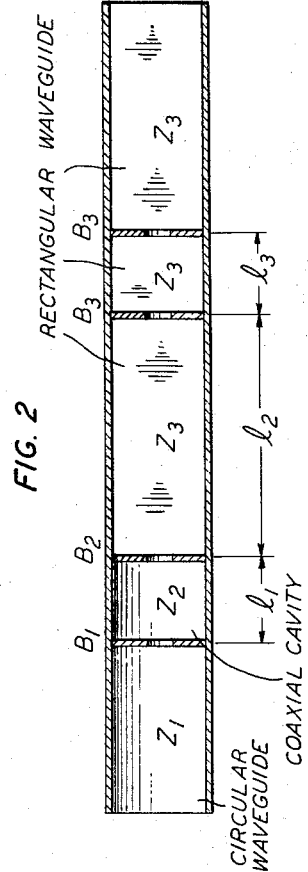
INVENTORS  A. J. GIGER
J. J. SCHOTTLE
BY
ATTORNEY

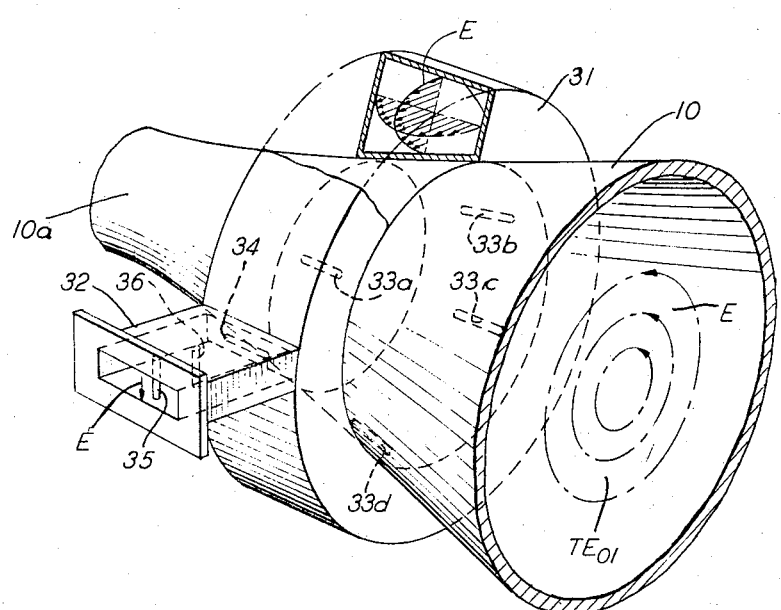
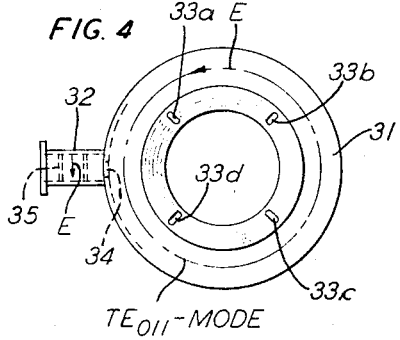
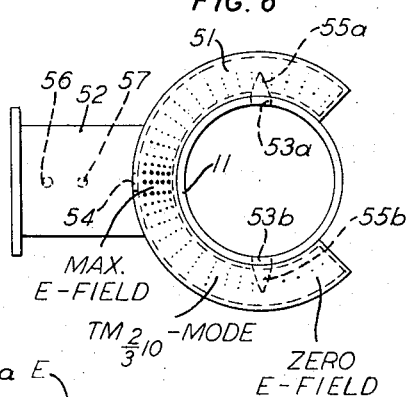
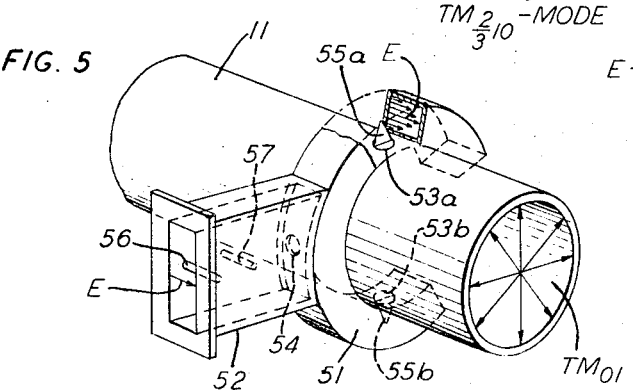

United States Patent Office 3,369,197
Patented Feb. 13, 1968

3,369,197
WAVEGUIDE MODE COUPLER
Adolf J. Giger, Murray Hill, and John J. Schottle, Plainfield, N.J., assignors to Bell Telephone Laboratories, Incorporated, New York, N.Y., a corporation of New York
Filed Jan. 5, 1965, Ser. No. 423,453
14 Claims. (Cl. 333—21)

This invention relates to electromagnetic wave energy transmission systems and more particularly to a system for coupling selected modes of wave energy propagating in a circular guide system to another system and for rejecting other modes of propagation in that system.

Ground stations suitable for operating with high capacity communicaton satellite repeaters require large steerable antennas. Such antennas ordinarily have very narrow pencil beams which have to be accurately directed at all times toward the moving satellite. Preferably, the ground station antenna itself is used to track the satellite automatically, for example, by the reception and analysis of a beacon signal transmitted by the satellite. For a circularly polarized beacon signal, the two lowest order modes, namely the $TE_{11}$, and the $TM_{01}$, yield sufficient information with which to produce tracking error signals. The amplitude of the $TM_{01}$ signal in the waveguide is directly proportional to the pointing error and the $TE_{11}$ signal provides a reference against which the phase and amplitude of the $TM_{01}$ signal are measured. The horizontal and vertical components of the dominant mode are coupled-out individually and supplied along with the $TM_{01}$ signal to the processing equipment. If the beacon signal is arbitrarily polarized, additional information, for example, information in the $TE_{01}$ mode is also required to produce the required tracking signals.

Normally, the automatic tracking equipment is entirely separated from the communications portion of the system. This is achieved by utilizing a beacon frequency in the satellite that is separated from the communications signal frequencies, and by recovering the beacon signal at the ground station by way of a coupler located in the antenna system ahead of the communications transmitter and receiver. It is, of course, essential that the coupler, which extracts individually the $TE_{11}$ dominate mode information and the $TM_{01}$ and $TE_{01}$ modes, does not interfere with the communications signals in any way. It must not introduce loss, reflections or noise to the communications channel. In a typical example, the beacon signal radiated by the satellite repeater may be located somewhere in the 4 gc. common carrier band, i.e., between 3700 and 4200 mc. Communications signals are carried in the 4 and 6 gc. common carrier bands. In the case of the $TE_{11}$ mode information, a narrow bandpass characteristic is therefore required since the beacon signal may be separated from a communications channel by as little as 25 mc.

Tracking accuracy is, of course, dependent on the efficiency with which the mode information is recovered and used in preparing the error control signals. It is desirable, therefore, that each mode signal be recovered completely and without being affected by the communications signals or the other mode of the beacon signal.

It is the principal object of the present invention, therefore, to improve the efficiency and discrimination by which each mode of a circularly polarized wave, excited in a circular waveguide system, is extracted from the system to the exclusion of all others.

Because of the symmetry of circular waveguide modes, it has heretofore been conventional to employ symmetrical passband filters for coupling mode energy from a circular waveguide to a dividing point, such as a waveguide hybrid network, wherein mode separation is achieved. In this way, energy in two or more modes is withdrawn from the circular waveguide and conveyed to an external separation network. However, by coupling several modes of information via the same filter system to the separation network, unwanted resonances may be generated and considerable coupling between modes may take place.

It is another object of the present invention to extract selected mode signals from a waveguide system individually such that all of the signal energy of that mode is withdrawn from the system without, however, disturbing the transmission through the system of other signals.

According to the present invention, completely independent coupled networks are employed for removing the several modes of an arbitrarily polarized signal from a circular waveguide system. By means of a system of spaced couplers, unwanted resonances are minimized, adjacent mode coupling is virtually eliminated, and the mode signal sampled by the coupler is entirely removed from the communications waveguide system. Each individual coupling section can thus be optimumly tuned for the acceptance of one mode of wave propagation only, and arranged to assure a complete extraction of that mode from the system.

The individual coupling sections are located at points in the waveguide feed system at which no modes higher than the ones to be extracted can propagate. In the case of a cylindrical waveguide of circular cross-section, this condition is fulfilled by controlling the diameter of the guide. In order to assure that all of the energy of a particular mode is removed by way of the corresponding coupler section, a band reflection filter for this mode is placed in the circular guide behind the coupling section. Complete reflection may be obtained for an individual mode, for example, by band reflection cavities or by a change in waveguide diameter to one below the cutoff frequency of the particular mode. A taper section may be used. However, in order to reduce the frequency sensitivity of the overall coupling circuit, it is in accordance with the invention to maintain the smallest possible separation between each coupler and the corresponding reflection point.

It is another object of the invention to provide a multimode coupler for sampling individual modes of energy propagating in a waveguide system with maximum coupling efficiency and minimum intersignal interference.

In further accordance with the present invention, each of the individual coupler sections comprises a maximally flat two-section filter. In the case of $TM_{01}$ and $TE_{01}$ coupler sections, a first filter element is employed which consists of a coaxial cavity wrapped around the central waveguide and coupled to it by a plurality of apertures. The apertures are selected and spaced to reduce the possibility of coupling into the cavity of other modes which exist in the central waveguide. It has been found that by employing symmetrically disposed pairs of apertures, complete cancellation of undesired mode signals may be achieved without affecting the efficiency with which the desired mode is coupled from the central guide to the cavity. The second section of the filter employs a rectangular waveguide section attached to the coaxial cavity by way of a single aperture or iris. Thus, the coaxial cavity, which resonates in one particular waveguide mode only, acts as a single pole filter between the circular and the rectangular waveguide sections.

The $TM_{01}$ coupler section cavity, in accordance with the invention, is truncated to cover only about three quarters of the circumference of the central waveguide. This reduces the size of the cavity and therefore reduces the number of modes which may be excited in the cavity. Further, the length of the cavity in the axial direction is kept short so that no standing waves can develop in this direction even at the high communications frequencies carried by the circular waveguide system. Consequently, no TE modes can be excited in the cavity and no TM modes with a nonzero number in the third (last) coding digit are possible up to the highest communications frequency transmitted in the circular guide. A diametrically opposed pair of circular irises, spaced 45° or so from the end plates of the truncated cavity, are used for coupling energy from the central waveguide into the cavity. The rectangular output guide is iris coupled to the middle of the cavity where the circumferential magnetic field is the strongest. High frequency resonances are further impeded by means of a vane placed in a circumferential direction, parallel to the wall currents of the $TE_{11x}$ mode, across each iris.

The $TE_{11}$ horizontal and vertical coupling sections of the composite coupler of the invention each comprise a two-section rectangular coupling cavity attached to the circular guide in the form of an E-plane junction. Coupling is by means of the circumferential H-field in the circular guide at a point where the E-field is zero. Two-band reflection filters, spaced an odd number of quarter wavelengths, are separated from the coupling cavities by integer numbers of half wavelengths to produce a maximally flat reflection characteristic. Iris resonances at high frequencies are reduced by means of a set of truncated vanes placed in each iris. Additional small capacitances in the circular guide opposite each coupling iris are employed to compensate the two parasitic shunt inductances of each iris.

The invention will be more fully apprehended from the following detailed description of illustrative embodiments thereof shown and described with reference to the accompanying drawings, in which:

FIG. 1 is a perspective view of an illustrative four sectioned mode coupler in accordance with the invention;

FIG. 2 is an equivalent circuit representation of the $TE_{01}$ and $TM_{01}$ coupling sections of the composite coupler of FIG. 1;

FIG. 3 represents in a perspective view, a $TE_{01}$ cavity coupler in accordance with the principles of the invention;

FIG. 4 is a simplified transverse cross-sectional view of the cavity coupler of FIG. 3 which shows a representation of the wave pattern within the cavity;

FIG. 5 represents in a perspective view, a $TM_{01}$ coupler constructed in accordance with the principles of the present invention;

FIG. 6 is a simplified transverse cross-sectional view of the cavity coupler of FIG. 5 which shows a representation of the wave pattern with the cavity;

Figure 7:
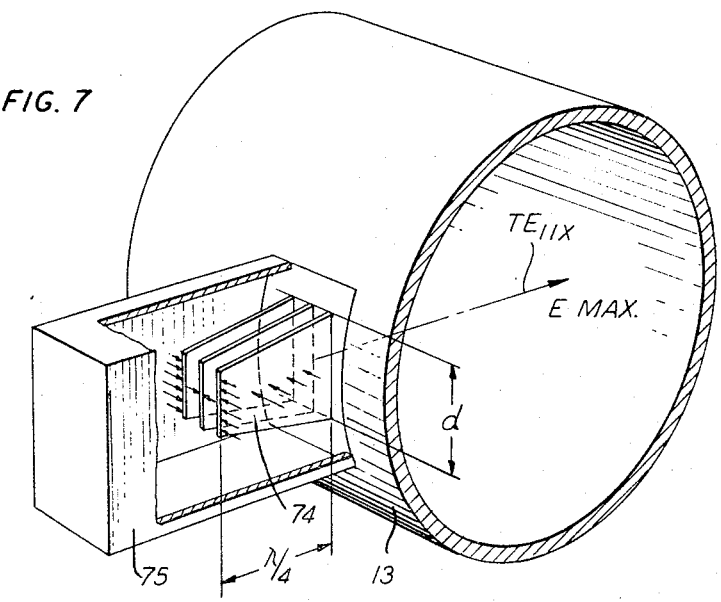
FIG. 7 shows, by way of a perspective view, the vane structure employed in the $TE_{11x}$ couplers of the invention.

A typical assembly of individual mode couplers in accordance with the principles of the present invention is illustrated in FIG. 1. A central waveguide system receives incoming electromagnetic energy from horn antenna 10 or the like. Communications signals, for example, in the 4 gc. common carrier band are conveyed by way of the horn and the waveguide system to the communication receiver apparatus, not shown, but to the left of the assembly of FIG. 1. Signals in the 6 gc. common carrier band and generated in a communications transmitter, also to the left of the assembly of FIG. 1, are guided through the central waveguide to horn antenna 10. Adjacent-band beacon signals, which are generally arbitrarily polarized, are also received by horn 10 and directed through the waveguide system. Energy in the $TE_{01}$ mode is extracted, to the exclusion of the other modes, by way of coaxial cavity coupler 30 positioned at the throat of horn 10 near the apex, i.e., in the tapered section which joins the conical horn to circular waveguide section 11. More particularly, the coupler is positioned to coincide with the first maximum of the $TE_{01}$ field in the taper that interacts strongest with the type of coupling aperture employed. This point can be found by calculation or measurement and it constitutes the smallest possible separation to the reflection point in the portion 10a of the horn taper. Frequency sensitivity of the overall coupling circuit is therefore reduced. Coupler 30 is effectively a two-section filter made up of coaxial cavity 31 and coupled rectangular guide section 32. The construction of these sections is shown in greater detail in FIG. 3. Cavity 31 is coupled to horn 10 by way of a plurality of apertures. In practice, elongated slots extending in the axial direction are preferred. That portion of the horn taper (10a) to the left of coupler 30, constitutes a broad-band reflection filter which returns any $TE_{01}$ energy which fails to exit via the coupler, to the coupler. In this way, all of the $TE_{01}$ energy is removed from the waveguide system but all of the other beacon energy modes and the communications signals are unaffected and continue to propagate through the system. Horn 10 is coupled to a section of circular waveguide 11 whose diameter is selected to reject the $TE_{01}$ mode (its diameter, of course, is that of the diameter of the terminal end of horn 10), but which supports the two remaining modes, $TM_{01}$ and $TE_{11}$.

Coupler 50 is employed to extract the $TM_{01}$ energy. It employs a truncated coaxial cavity 51 and a coupled rectangular waveguide section 52. Any $TM_{01}$ energy which fails to exit via coupler 50 is returned to the coupler by way of a broad-band reflection filter formed by tapered circular waveguide section 12, whose minimum diameter is below the cutoff frequency of that mode. Section 12 thus couples waveguide section 11 to waveguide 13, which conveys signal energy through the system (to the left in FIG. 1).

The horizontal and vertical components of the $TE_{11}$ mode are extracted by way of couplers 60 and 70 located at spaced intervals along waveguide 13. Individual two-section band-reject filters, 61 and 62, and 71 and 72, for couplers 60 and 70, respectively, return energy to the couplers that might fail to exit through sections 60 and 70.

Each section of the composite four mode coupler is thus independent from all the others. Each is located at a point in the waveguide system at which no higher modes can exist, and each is uniquely adapted to extract one mode only from the several modes propagating in the waveguide system.

The equivalent circuit of coaxial cavity couplers 30 and 50 is shown in FIG. 2. In FIG. 2, $Z_1$, $Z_2$, and $Z_3$, represent the equivalent characteristic impedances, respectively, of the circular waveguide, e.g., 11, the coaxial cavity 51, and the coupled rectangular waveguide, e.g., 52. $B_1$ represents the equivalent susceptance produced by all of the coupling slots between the circular guide and the coaxial cavity and the effect of the mode reflector, i.e., the adjacent taper section in the circular guide in the embodiment of FIG. 1. $B_2$ represents the susceptance of the coupling slot between the coaxial cavity and the rectangular waveguide. Similarly, $B_3$ represents the susceptance of the output filter. The equivalent length of the coaxial cavity is denoted by $l_1$ and the length of the rectangular guide coupling the two resonators is denoted by $l_2$. The length of the second resonator is denoted by $l_3$. The values in the circuit for any particular application are adjusted to give a two-section band-pass filter characteristic with maximally flat transmission. Techniques for achieving such a characteristic are described, for example, in "Principles and Applications of Waveguide Transmission" by G. C. Southworth, published by Van Nostrand. In practice, the values $Z_1$, $Z_2$, $B_1$, $B_2$, and $l_1$ do not have to be known explicitly.

The dimensions of each coaxial cavity are calculated on the basis of resonance in the desired mode. Initially, the calculation is made under the assumption of no coupling irises. Irises $B_1$ and $B_2$ are then cut into the cavity such that a perfect impedance match is obtained as seen from the side of the rectangular guide ($Z_3$) with the circular guide terminated in its characteristic impedance $Z_1$ on the antenna side. The tapered section in the circular guide opposite the antenna provides a means of completely reflecting any of the signal which fails to exit the circular guide system via the coupler. The phase of this reflection is preferably such that maximum coupling into the coaxial cavity can take place. Such a condition results in the smallest possible value of $B_1$ for a given size of the coupling slots. A deviation from the optimum phasing condition will increase the value and the frequency sensitivity of $B_1$. The desired bandwidth of the first section of the filter is obtained by slowly reducing $B_1$ and $B_2$, for example, by increasing the size of the coupling slots. Slight detuning of the cavity results from the introduction of the coupling irises. However, the resonant frequency of the cavity may be reset by means of tuning screws or the like.

The second cavity is formed between two irises $B_3$ separated by the distance $l_3$. It is separately tuned and matched to the same frequency and bandwidth as the first one. The distance $l_2$ is finally adjusted for maximally flat transmission, or impedance matching, with a half-power bandwidth of 0.707 time the bandwidth of the individual cavities.

It is a characteristic of a coaxial cavity to possess a large number of resonant frequencies spaced not too far apart in a nonharmonic relation. Many of these cavity modes become excited through the slots by the various modes propagating in the circular waveguide. It is especially important to reduce to a maximum the interaction with the information carrying $TE_{11}$ mode over the full width of the two common carrier bands, e.g., from approximately 3700 to 4200 mc. and from approximately 6000 to 6500 mc. This problem can be eased by selecting the lowest possible mode in the coaxial cavity which allows coupling to the desired mode in the waveguide. In the case of the $TE_{01}$ mode, the cavity should be made to resonate, for example, in the $TE_{011}$ mode. This particular mode consists of a $TE_{01}$ wave in the coaxial line which is reflected back and forth between two end plates to form a standing wave in axial direction of just one-half wavelength.

FIG. 3 shows in somewhat greater detail construction of a $TE_{01}$ coupler in accordance with the invention, i.e., the coupler illustrated in outline form as coupler 30 in FIG. 1. Coaxial cavity 31 is effectively wrapped around the apex portion of horn 10 and is coupled to it by four equally spaced axial slots 33. Coupling of the $TE_{01}$ mode propagating in the tapered section 10 is by means of the strong axial magnetic field along the slots. Since TM modes have no axial magnetic field, they do not excite the $TE_{011}$ mode in the coaxial cavity to any extent. Any number of slots less than four would cause the cavity to be excited by not only the $TE_{01}$ but also the $TE_{11}$ and the $TE_{21}$ modes. If modes higher than $TE_{01}$ are propagating in the inner guide, the number of slots must be increased. It has been found that the following relation holds between modes in the circular waveguide and the number of slots required for high mode discrimination:

| All modes propagating up to but not including mode | Minimum number of slots required for coupling-out $TE_{01}$ mode with high rejection of all the other modes |
|---|---|
| $TE_{41}$ | 4 |
| $TE_{61}$ | 8 |
| $TE_{81}$ | 12 |
| $TE_{10,1}$ | 16 |
| $TE_{n1}$ | (n-1)2 |

Turning briefly to FIG. 4, the schematic cross section of cavity 31 illustrates the selected positions of the coupling slots. In accordance with the invention, the four slots are placed in the wall of horn 10 in diametrically opposed relation and symmetrically spaced with regard to each other. The rectangular waveguide 32 is coupled to the cavity by a single slot 34. Actually, it could be coupled at any point on the circumference of cavity 31 because of the uniform distribution of the axial magnetic field. However, in order to minimize direct "reach-through" from the inner to the outer slots, i.e., in order to minimize higher order mode or fringing effects, the output is preferably placed between two of the inner slots.

FIG. 3 illustrates additionally the electric (E) field distribution with cavity 31. Because of this distribution, the axial slots are effective to extract virtually all of the $TE_{01}$ energy propagating in the horn. That energy that fails to exit is, however, reflected by the apex section $10_a$ of the horn (FIG. 1) so that none of it is carried by the waveguide system. Posts 35 and 36 in rectangular waveguide 32 form the second cavity of the two-section band-pass filter.

The $TM_{01}$ coupler shown in FIG. 5 (corresponding to coupler 50 in FIG. 1) consists of a truncated coaxial cavity 51 covering 270° of the circumference of the circular waveguide 11. The cavity resonates in the $TM_{2/3\ 10}$ mode. This mode is preferred over the more obvious $TM_{010}$ mode which exists in a nontruncated cavity because of the greater frequency separation it affords between the desired and the next higher mode, namely the $TM_{4/3\ 10}$. This mode is strongly excited by the $TE_{11}$ mode in the circular guide. It is well known that the larger a resonant cavity, for a given frequency, the greater the number of close-by resonances or modes. Since truncation reduces the size of a cavity, it is a suitable technique for reducing the number of modes in a given frequency band. The length of cavity 51 in the axial direction is kept short so that no standing waves can develop in this direction even at the highest communication frequency transmitted in the waveguide. This means that no TE modes can exist at all and that no TM modes with a nonzero number in the third (last) coding digit are possible up to about 7000 mc. Two circular irises, 53a and 53b, spaced by 180° and 45° away from the end plates of the cavity are used for coupling. They guarantee that the $TM_{2/3\ 10}$ mode is excited by the $TM_{01}$ energy, but not by the $TE_{11}$ mode in the guide. Rectangular output guide 52 is coupled by iris 54 to the middle of cavity 51 where the circumferential magnetic field is strongest.

In general, the $TM_{01}$ mode cavity is proportioned in the axial direction to prevent the development of standing waves in the axial direction at the highest wave energy frequencies propagating in the circular waveguide. It is proportioned in the circumferential direction to an angle $\beta$, where $\beta$ is equal to an integral multiple $k$ of 180 divided by a factor $m$, that is, the circumferential extent of the cavity $\beta$ is equal to 180 $k/m$. With this proportioning, the number of modes that may be excited in the cavity is reduced. Finally, the $TM_{01}$ cavity is proportioned in the radial direction to establish resonance in the $TM_{m10}$ mode.

It has been found that coupling slots working at frequencies in the 4 gc. common carrier band can be strongly resonant at frequencies in the 6 gc. band. This coupling is particularly bad with long shaped slots. Circular irises have a higher resonance for a given amount of coupling and, therefore, are preferred for coupler 50. Even with their use, it is necessary to guard against possible 6 gc. resonances, which may be excited by the $TE_{11y}$ mode. This is done in accordance with the invention by placing single vanes 55a and 55b across the iris in the circumferential direction, parellel to the wall currents of the $TE_{11y}$ mode, and extending into cavity 51. This vane in no way affects the operation of the $TM_{01}$ coupler.

FIG. 6 illustrates, in a simplified cross-sectional view, the electric field pattern which exists in cavity 51. It will be noted that apertures 53 are diametrically spaced at points symmetrically disposed with reference to output aperture 54. It has been found that this relation gives rise to satisfactory TM mode excitation in the cavity and virtually eliminates excitation by the $TE_{11}$ mode in the circular guide.

The $TE_{11x}$ and $TE_{11y}$ couplers 60 and 70, illustrated in outline form in FIG. 1, each consist of two band-reflection cavities on the left side and a two-section coupling cavity on the right side, i.e., on the side near the antenna. The cavities are attached to circular guide 13 by way of E-plane junctions and coupling is by means of the circumferential H-field in the circular guide at a point where the E-field is zero. Spacing between the two rejection cavities is made an odd number of quarter wavelengths in order to produce a maximally flat reflection characteristic. The output filter is separated from the nearest reflection cavity by an integral number of half wavelengths. Screws exactly opposite the coupling apertures (see FIG. 8, screw 81) represent small capacitances which are used to compensate the two parasitic shunt inductances of each iris. Equivalent circuits for E and H-plane junctions are found in "Waveguide Handbook," vol. 10 of the MIT Radiation Laboratory Series, published by McGraw-Hill. Exact compensation is achieved when the reflection coefficient caused by the iris is symmetrical as measured in the circular guide far away from the coupler frequency. If desired, the screws can be adjusted to minimize the reflections at an adjacent communications frequency either above or below the coupler frequency.

In order to reduce iris resonances at higher frequencies, a set of truncated vanes is placed in each aperture. FIG. 7 illustrates the construction and installation of the vanes. Vanes 74 provide an easy current path for the $TE_{11y}$ mode at 4 and 6 gc. In addition, since the vanes are made a quarter wavelength long at 6 gc., they eliminate an iris resonance excited by the $TE_{11x}$ mode at 6 gc. This resonance can exist because the iris width $d$ is not far away from a half wavelength at 6 gc. The vanes, in effect, form a quarter wave stub which is open circuited on the inside of cavity 75 and therefore produces a short circuit in the plane of the iris.

Figure 8:
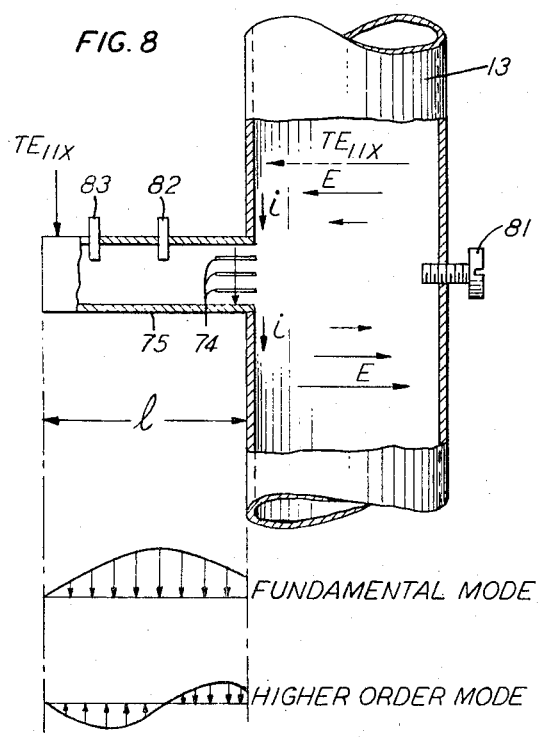
FIG. 8 illustrates a cross-section of the $TE_{11x}$ coupler of the invention.

The $TE_{11x}$ mode at 6 gc. can also excite a higher order mode in the rectangular waveguide cavity due to the same mechanism which is responsible for the desired 4 gc. resonance. Vanes 74 do not affect this resonance since the electric field is not only vertical to the vanes but also in the same direction across the rectangular guide. FIG. 8 shows, by way of a cross-sectional view, how this resonance is eliminated in accordance with the present invention. This higher order mode cannot be affected by tuning screw 82 in the middle of rectangular cavity 75 since the electric field is zero there. If, instead, tuning screw 83 is employed, the 6 gc. resonance is moved below the 6 gc. common carrier band where it does not do any harm. Screw 83 therefore actually serves two purposes. It tunes the cavity exactly to the 4 gc. beacon frequency, and it moves the 6 gc. resonance out of the common carrier band.

The above described arrangements are, of course, merely illustrative of the application of the principles of the invention. Numerous other arrangements may be devised by those skilled in the art without departing from the spirit and scope of the invention.

What is claimed is:

1. A selective mode transducer for electromagnetic wave energy comprising: a waveguide system, including a conical horn coupled to a section of a circular waveguide, for supporting wave energy in a plurality of individual modes of propagation; a cavity section coupled to said horn for extracting energy of a first mode from said system, a plurality of cavity sections spaced along said circular guide section, each of said plurality of cavity sections being individually coupled to said circular section for independently extracting a different mode of wave energy from said system; and means associated with each one of said cavities for assuring complete suppression of said extracted energy mode from the remainder of said system, said suppression means including means for reflecting that mode energy.

2. In combination, a waveguide system for supporting a plurality of different modes of wave propagation, first means including a tuned cavity coupled to said system for extracting a first selected mode of wave energy propagating in said system, a first band reflection filter in circuit relation with said first means for returning to said first means any energy of said first mode which fails to exit said system via said first means, second means including a tuned cavity coupled to said system for extracting a second selected mode of wave energy propagating in said system, a second band reflection filter in circuit relation with said second means for returning to said second means any energy of said second mode which fails to exit said system via said second means, third means including a tuned cavity coupled to said system for extracting a third selected mode of wave energy propagating in said system, a third band reflection filter in circuit relation with said third means for returning to said third means any energy of said third mode which fails to exit said system via said third means, fourth means including a tuned cavity coupled to said system for extracting a fourth selected mode of wave energy propagating in said system, and a fourth band reflection filter in circuit relation with said fourth means for returning to said fourth means any energy of said fourth mode which fails to exit said system via said fourth means.

3. A selective mode transducer for electromagnetic wave energy comprising, in combination, a waveguide system for supporting wave energy in a plurality of individual modes of wave propagation, said waveguide system including a conical horn and a section of circular waveguide coupled to said horn, a first coaxial cavity section coupled to said horn, a first tuned rectangular waveguide section coupled to said first cavity section, said first cavity and said first rectangular section serving to extract wave energy of a first mode of propagation from said system, a second coaxial cavity section coupled to said circular waveguide, a second tuned rectangular waveguide section coupled to said second cavity section, said second cavity and said second rectangular sections serving to extract energy of a second mode from said system, third and fourth rectangular waveguide cavities spaced apart along sair circular waveguide and coupled thereto for individually extracting energy of third and fourth modes of propagation from said system, and means associated with each one of said cavities for reflecting mode energy that fails to exit therethrough back to said corresponding section, thereby to assure complete extraction of all of the energy from said first, second, third, and fourth modes.

4. A selective mode transducer comprising, in combination: a waveguide system for supporting a plurality of different modes of wave propagation, said system including a conical horn, a section of circular waveguide of a first diameter coupled to said horn, a tapered circular waveguide section coupled to said first circular section, and a second circular waveguide section of a second diameter coupled to the smaller end of said tapered section; first means for extracting a first selected mode of propagation from said system to the exclusion of all others, said first extraction means comprising, a first coaxial cavity coupled to said horn by way of a plurality of spaced axially aligned apertures, and means including a first tuned rectangular waveguide section coupled to said first cavity; second means for extracting a second selected mode of propagation from said system to the exclusion of all others, and second extraction means comprising, a second coaxial cavity coupled to said first circular waveguide section by way of a plurality of spaced circular apertures, and means including a second tuned rectangular waveguide section coupled to said second cavity; third and fourth means for extracting third and fourth selected modes of propagation, respectively, from said system to the exclusion of all others, said third and fourth extraction means comprising, third and fourth tuned rectangular waveguide sections spaced apart from one another along said second circular waveguide section and each coupled thereto by a vaned aperture; and a plurality of band reflection filters associated with said waveguide systems for reflecting back through said waveguide system that energy of said first, second, third and fourth modes, respectively, that fails to exit completely via said first, second, third and fourth extraction means.

5. A selective mode transducer for electromagnetic wave energy propagating within a circular waveguide system, which comprises, a circular waveguide system supporting wave energy propagating via a plurality of different modes, a cylindrical cavity coaxially affixed to said circular waveguide system and coupled to it by a plurality of symmetrically spaced elongated slots extending in the axial direction of said system, said cylindrical cavity being proportioned to establish a standing wave in said axial direction of one-half wavelength at the frequency of a selected one of said modes of wave propagation, a rectangular waveguide section tuned to the frequency of said selected mode of wave propagation, one end of said rectangular waveguide section being coupled to the outer wall of said cylindrical cavity by an elongated slot, and means associated with said circular waveguide system for preventing said selected mode from propagating in said circular waveguide system beyond said cylindrical cavity.

6. A selective mode transducer for electromagnetic wave energy propagation within a circular waveguide system, which comprises, a circular waveguide system supporting wave energy propagating in a plurality of modes, a cylindrical cavity coaxially affixed to said circular waveguide system and coupled to it by a plurality of symmetrically spaced pairs of elongated slots extending in the axial direction of said circular waveguide system, said cylindrical cavity being dimensional to establish resonance in a selected one of said modes of propagation with a standing wave in said axial direction of one-half wavelength at the frequency of the said selected mode of wave energy propagation, a rectangular waveguide section whose greater transverse dimension is substantially equal to the axial length of said cylindrical cavity, one end of said rectangular waveguide section being coupled to the outer wall of said cylindrical cavity by a single elongated slot disposed in said outer wall midway between the radial positions of an adjacent pair of said plurality of slots in said circular waveguide system, means for tuning said rectangular waveguide section to the resonant frequency of said cylindrical cavity, and a tapered waveguide portion of said circular waveguide system beyond said cylindrical cavity in the direction of propagation of said wave energy, the smaller diameter of said tapered section being below the cutoff frequency of said selected mode of propagation.

7. A selective mode transducer for electromagnetic wave energy propagating in the $TE_{01}$ mode within a circular waveguide system, which comprises, a circular waveguide system suporting wave energy propagating in a plurality of different modes, a cylindrical cavity coaxially affixed to said circular waveguide system and coupled to it by a plurality of symmetrically spaced elongated slots extending in the axial direction of said system, said cylindrical cavity being proportioned to establish a standing wave in said axial direction of one-half wavelength of the $TE_{011}$ mode existing in said cylindrical cavity to establish resonance in the $TE_{011}$ cavity mode at the frequency of said propagating $TE_{01}$ mode wave energy, a rectangular waveguide section whose greater transverse dimension is substantially equal to the axial length of said cylindrical cavity, one end of said rectangular waveguide section being coupled to the outer wall of said cylindrical cavity by a single elongated slot disposed in said outer wall midway between the radial positions of an adjacent pair of said plurality of slots in said circular waveguide system, and a tapered waveguide section axially coupled to said circular waveguide system beyond said cylindrical cavity in the direction of propagation of said wave energy, the smaller diameter of said tapered section being below the cutoff frequency of said $TE_{01}$ mode of propagation.

8. A selective mode transducer as defined in claim 7 wherein said cylindrical cavity is coupled to said circular waveguide system by four elongated slots spaced symmetrically about the periphery of said circular waveguide system.

9. A selective mode transducer as defined in claim 7 wherein said cylindrical cavity is coupled to said circular waveguide system by four elongated slots spaced symmetrically about the periphery of and in a plane perpendicular to the axis of said circular waveguide system.

10. A selective mode transducer for electromagnetic wave energy propagating within a circular waveguide system, which comprises, a circular waveguide supporting wave energy propagating in a plurality of different modes, a truncated cylindrical cavity coaxially affixed to said circular waveguide and coupled to it by a plurality of symmetrically spaced apertures, said truncated cylindrical cavity being dimensional in the axial direction of said circular waveguide to prevent the establishment of standing waves in said axial direction, a rectangular waveguide section tuned to support the frequency of said selected mode of wave propagation, one end of said rectangular waveguide section being coupled to the outer wall of said truncated cylindrical cavity by a single aperture, and means associated with said circular waveguide for preventing said selected mode from propagating in said circular waveguide beyond said truncated cylindrical cavity.

11. A selective mode transducer for electromagnetic wave energy propagating within a circular waveguide system, which comprises, a circular waveguide supporting wave energy propagating in a plurality of modes, a truncated cylindrical cavity coaxially affixed to said circular waveguide over approximately three-quarters of the circumference thereof and coupled to said waveguide by a pair of diametrically opposed circular apertures, said truncated cylindrical cavity being dimensional in the axial direction of said circular waveguide to prevent the development of standing waves in said axial direction and being dimensional in the radial direction to establish a standing wave of one-half wavelength for a selected mode of propagation, a rectangular waveguide section whose greater transverse dimension is substantially equal to the axial length of said cylindrical cavity, one end of said rectangular waveguide section being coupled to the outer wall of said cylindrical cavity by a single circular aperture in said outer wall midway between the radial positions of said pair of apertures in said circular waveguide, and a tapered waveguide section axially coupled to said circular waveguide beyond said truncated cylindrical cavity in the direction of propagation of said wave energy, the smaller diameter of said tapered section being below the cutoff frequency of said selected mode propagation.

12. A selective mode transducer for electromagnetic wave energy propagating in the $TM_{01}$ mode within a circular waveguide system, which comprises: a circular waveguide supporting wave energy propagating in a plurality of different modes; a truncated cylindrical cavity coaxially affixed to said circular waveguide and coupled to it by a pair of diametrically opposed circular apertures, each of said apertures being equipped with a single conductive vane extending into said cavity in a plane substantially perpendicular to the direction of propagation of energy in said circular waveguide, said cavity being proportioned (a) in the axial direction to prevent the development of standing waves in the axial direction at the highest wave energy frequencies propagating in said circular waveguide, (b) in the circumferential direction to an angle $\beta$, where $\beta$ is equal to an integral multitple of 180 divided by the factor $m$, in order to reduce the number of modes that may be excited in the cavity, and (c) in the radial direction to establish resonance in the $TM_{m10}$ mode, a rectangular waveguide section whose smaller transverse dimension is substantially equal to the axial length of said cylindrical cavity, one end of said rectangular waveguide section being coupled to the outer wall of said cavity by a single circular aperture at a point at which the circumferential magnetic field is strongest within said circular waveguide, means for tuning said rectangular waveguide section to the resonant frequency of said truncated coaxial cavity, and means including a tapered waveguide section axially coupled to said circular waveguide beyond said cavity in the direction of propagation of said wave energy, the smaller diameter of said tapered section being below the cutoff frequency of said $TM_{01}$ mode of propagation.

13. A selective mode transducer for electromagnetic wave energy propagating in the $TM_{01}$ mode as defined in claim 12, wherein said cavity is proportioned in the (b) circumferential direction to $\beta = 270°$, and is proportioned in the (c) radial direction to establish resonance in the $TM_{2/2\ 10}$ mode.

14. A selective mode transducer for electromagnetic wave energy propagating via a plurality of different modes within a circular waveguide system, which comprises: a circular waveguide supporting wave energy propagating in a plurality of different modes; a rectangular coupling cavity radially attached to said circular waveguide for extracting one of the two orthogonal components of the fundamental $TE_{11}$ mode, said cavity being electrically coupled to said circular waveguide by an E-plane junction at a point in said circular guide at which the E-field of said $TE_{11}$ mode is substantially zero; first and second band reflection cavities each radially attached to said circular waveguide and coupled thereto by means of a single E-plane junction, said first band reflection cavity being spaced an integral number of half wave lengths at the frequency of said wave energy propagating in said circular waveguide system from said coupling cavity, each of said band reflection cavities being spaced an odd number of quarter wavelengths from one another in the axial direction of said circular waveguide, a plurality of truncated conductive vanes disposed in the E-plane junction of each of said cavities and extending into said cavities in planes substantially perpendicular to the axis of said circular waveguide for establishing a short circuit in the planes of said apertures and an open circuit in the interior of said cavities at the higher wave energy frequencies propagating in said circular waveguide, the length of each of said truncated vanes being a quarter wave length long at said higher wave energy frequencies, whereby said plurality of vanes disposed in each of said E-plane junctions together form an effective quarter wave stub; capacitive means disposed in said circular waveguide at a point opposite each of said apertures for compensating for parasitic shunt inductance of said apertures; and means for tuning each of said rectangular cavities to resonance at said selected frequency thereby to move undesired resonances out of the band of said higher wave energy frequencies.

References Cited
UNITED STATES PATENTS

| | | | |
|---|---|---|---|
| 2,748,350 | 5/1956 | Miller | 333—21 XR |
| 2,952,820 | 9/1960 | Lewin | 333—21 XR |
| 3,274,604 | 9/1966 | Lewis | 333—21 XR |

HERMAN KARL SAALBACH, *Primary Examiner.*

M. L. NUSSBAUM, *Assistant Examiner.*